United States Patent [19]

Tufts et al.

[11] Patent Number: 4,855,368

[45] Date of Patent: Aug. 8, 1989

[54] THERMOSET RESINOUS MOLDING COMPOSITIONS

[75] Inventors: Timothy A. Tufts; Dan Borgnaes; Billy M. Culbertson, all of Columbus; Theodore C. Wilkinson, Dublin, all of Ohio

[73] Assignee: Ashland Oil, Inc., Ashland, Ky.

[21] Appl. No.: 212,105

[22] Filed: Jun. 21, 1988

Related U.S. Application Data

[63] Continuation of Ser. No. 75,225, Jul. 17, 1987, abandoned, which is a continuation of Ser. No. 787,550, Oct. 15, 1985, abandoned.

[51] Int. Cl.$^4$ ............................................... L08L 63/10
[52] U.S. Cl. ......................................... 525/454; 525/28; 525/451; 525/455; 525/502; 525/528; 525/531
[58] Field of Search ............... 525/502, 528, 531, 922, 525/454, 455, 28, 451

[56] References Cited

U.S. PATENT DOCUMENTS

| | | |
|---|---|---|
| 3,373,221 | 3/1968 | May ...................................... 525/531 |
| 4,107,101 | 8/1978 | Kubens .................................. 525/28 |
| 4,296,020 | 10/1981 | Magrans ................................ 525/28 |
| 4,317,894 | 3/1982 | Lewarchik .......................... 525/455 |
| 4,334,034 | 6/1982 | Lehner .................................. 525/28 |
| 4,374,229 | 2/1983 | Dunnavant .......................... 528/73 |

Primary Examiner—Patricia Short
Attorney, Agent, or Firm—Herbert M. Hanegan; John F. Jones

[57] ABSTRACT

Thermoset resinous molding compositions are provided by essentially instantaneously combining and reacting three basic resin forming components. The latter include an oligomeric ester or polyester containing polymerizable unsaturation and free hydroxyl group(s); a polyisocyanate; and an aromatic polyamine. The indicated thermosetting resin systems are especially adapted for use in a reaction injection molding (RIM) operation.

3 Claims, No Drawings

THERMOSET RESINOUS MOLDING COMPOSITIONS

This is a continuation of application Ser. No. 071075,225 filed on 7/17/87, now abandoned, which is a continuation of application Ser. No. 787,550 filed on 10/15/85, now abandoned.

BACKGROUND OF THE INVENTION

1. Field of the Invention

This invention relates to thermoset resinous compositions derived from a mixture of a hydroxyl group bearing ethylenically unsaturated oligomeric reactant, a polyisocyanate and an aromatic polyamine.

2. Overview of the Prior Art

The production of shaped plastic articles by injection molding practices enjoys widespread industrial application. Although injection molding devices are capital intensive units this cost factor can be economically justified because of their high production output capability. There are, however, significant restrictive features of this type of molding operations. For one, the process is essentially limited to the production of moldings of thermoplastic materials which generally lack the structural strength requirements for many end-use applications. Also the production of large articles or moldings of intricate design is extremely difficult if not impractical.

A considerably more recent development in the art of resin molding which has the potential of approaching the productive efficiency of the aforesaid injection molding is that of reaction injection molding commonly referred to in the relevant industry as the RIM process. In the latter process a plurality of separate reactive streams are generated and then admixed to provide an instantaneously reactable system in a polymerization sense. The blended admixture is immediately pump-injected into a mold where the completion of the reaction within minutes results in a rigid shape or one sufficiently rigid for the purpose of demolding.

The RIM process was practiced commercially for the first time in the automobile industry where the method was employed for molding isocyanate based elastomeric components. The full potential in this industry, however, is now seen to reside in the use of thermosetting resin systems for preparing structural components; e.g., door panels, hood, etc., exhibiting requisite physical strength characteristics. Because of a number of esoteric demands posed by the method, the development of acceptable resin systems is a highly complexed endeavor. One of the more important early developments in this area culminated in the resin systems exemplified in U.S. Pat. No. 4,374,229 which features a combination of polyester resin and urethane chemistries. The present invention represents an improvement over the foregoing advance, by facilitating processing, all as will be brought out hereinbelow and providing moldings exhibiting improved physicals particularly stiffness and toughness.

SUMMARY OF THE INVENTION

In accordance with the present invention thermoset resinous compositions are provided via a resinification procedure in which a mixture of polymerizable components is obtained and molded in essentially an instantaneous manner. The contemplated resin forming components basically include a hydroxyl group bearing ethylenically unsaturated linear oligomeric esterification product, an aromatic polymaine and a polyisocyanate. Depending on the nature of the oligomer unsaturation a vinyl monomer or a multifunctional acrylate ester cross-linking agent is present.

In the preferred manner of carrying out the present invention; i.e., utilizing the RIM process to produce thermoset moldings, a number of advantages are inherent in the practice thereof. An important advantage is that the minimum of two reactant feed streams are at most needed. For example, the aromatic polymaine and an oligomer containing vinyl unsaturation are mutually non-reactable and thus can be combined in one stream. The other stream can consist of the polyisocyanate and vinyl monomer, provided the latter is utilized. A further advantage of considerable importance resides in the ability of the amine to inhibit incipient polymerization of the oligomer. On the other hand once the blended matrix is attained the amine serves to catalyze the urethane reaction and autocatalyze its reaction with the isocyanate resulting in overall faster reaction times.

DESCRIPTION OF THE PREFERRED EMBODIMENTS

In this description the various oligomers useful in the practice of this invention will be collectively referred to as resin monomers. As such there are three basic types. Particularly exemplary resin moonomers are the oligomeric polyesters disclosed in the aforementioned U.S. Pat. No. 4,374,229. These polyesters are essentially composed of a linear backbone of alternating dicarboxylic acid and diol residues. All or at least part of said diacid residues are derived from an $\alpha,\beta$-ethylenically unsaturated dicarboxylic acid such as maleic acid which is preferably subsequently isomerized to the corresponding trans (fumarate) configuration. These polyesters are singularly characterized by their terminal end groups; one being an acryloyl or methacryloyl group and the other being a hydroxyl group.

The applciable oligomers are conveniently prepared through means of a step-growth reaction whereby a diacid anhydride and epoxy compound; e.g., propylene oxide, progressively add in an alternating fashion to an active hydrogen atom-containing initiator. The specific initiators employed to prepare such polyesters are limited to the indicated acrylic acids or the half acid ester of the glycol corresponding to the epoxy reactant. Further details concerning this method are set forth in the above-referenced patent.

Another class of resin monomers useful herein are the so-called polyester diols. These are low molecular weight polyesters generally containing on the average one or two ethylenically unsaturated dicarboxylic acid residues and terminated at each end with a hydroxyl group. Maleic anhydride represents the preferred diacid reactant for preparing said diols. The latter can be prepared by the conventional condensation method or by the step-growth method described above for preparing the terminal acryloyl group containing olligomers. The relatively high temperatures and extended reaction time experienced in preparing the polyester diol by the conventional condensation method results in substantially complete conversion of the maleo residues to fumaro residues. The alternate method contemplated for preparing the polyester diol requires a separate isomerization step. Due to the indicated nature of the ethylenic unsaturation of the polyester diol, a vinyl monomer cross-linking agent is used in conjunction therewith all as will be brought out more appropriately hereinbelow.

A futher exemplary class of resin monomers in context of the present invention include the so-called vinyl esters. The term broadly connotes the reaction products of an acrylic acid and epoxy resins having orixane oxygen group polyfunctionality. The epoxy resins employed for preparing the preferred vinyl esters are based on two principal types. The glycidyl ethers of an aromatic polyol derived by reacting an aromatic polyol, especially bisphenol A, with epichlorohydrin consttitutes one of such types. The other type include the glycidyl ether derivatives of a novolak. Numerous types of these products are commercially available.

A vinyl monomer component can advantageously be included to increase cross-link density of the resultant compositions especially where the applicable resin monomer component solely contains fumaro unsaturation. Typically, styrene and the various acrylate esters are employed for this purpose. in the practice of the present invention, however, hydroxylanted vinyl monomeric cross-linking agents are particularly applicable. Exemplary of such cross-linking agents is 2-hydroxypropyl methacrylate. Other hydroxyl group bearing vinyl compounds are the partial acrylate esters of a polyol. Representative polyfunctional acrylate esters of this type include the diacrylate esters of trimethylpropane, ethylene glycol, pentaerythritol, etc.

A variety of aromatic and aliphatic polyisocyanates are suitable for use in the practice of this invention. Representative aromatic polyisocyanate include toluene diisocyanate, xylylene diisocyanate, p-phyenyelene diisocyanate, diphenyl diiosyanate, and methylene-4, 4'-diphenyl diisocyanate (MDI) as well as the various polymeric analogs thereof. Examples of aliphatic polyioscyanates are such as 1,4-tetramethylene diiosycanates, hexamethylene diisocyanate, isophorone diisocyanate and methylcycohexyl diisocyanate. Prepolymers of the aforementioned diisocyanates, that is, reaction products of the isocyanate and a lower diol can likewise be used. The prepolymer need not be preformed but can be conveniently generated in situ in the course of polymerizing the thermosetting composition. MDI, particularly the liquified versions and the polymeric analogs thereof are the preferred polyiocyanates. The polyisocyanate is present in the amount to provide an isocyanate index of from 95–120. The isocyanate index is the numerical ratio which the total NCO equivalents bears to the sum total of amino and hydroxyl equivalents present in the thermosetting composition $\times 100$.

An illustrative enumeration of polyfunctional primary and secondary aromatic amines useful in the practive of this invention follows. Diethyl toluene diamine; o, m, p-phenylene diamine; isomeric toluene diamines; methylene dianimline; bis(3)-chloro-4-amino-phenyl methane; polymethylene polyphenylene amines (condensation products of aniline and formaldehyde); 4-aminophenyl ether; 4,4'-diaminodiphenyl amine; isomeric diaminoanthraquinones; isomeric diaminonaphthalenes; 2,5-diamino pyridine; 4-aminophenyl sulfone; 4,4'-methylene bis(2, 6-diisopropyl aniline); N,N' dimethyl-1,3-phenylene diamine and N,N' diphenyl-1,4-phenylene diamine.

The following examples serve to illustrate the present invention including the best mode contemplated for carrying out same. All parts specified as such are parts by weight unless otherwise indicated.

EXAMPLE I (Prior Art)

This example serves to illustrate the preparation of a resin monomer which will be employed in the subsequent working example of the present invention. As such the formulation represents a modification of the polyester oligomer described in the corresponding example of U.S. Pat. No. 4,374,229.

Into a suitable resin reaction vessel were charged 321 parts of maleic anhydride, 309 parts of methacylic acid, 1.26 parts of hydroquinone and 3.25 parts of magnesium hydroxide. The reactor was evacuated to 0.2 atmosphere and dry nitrogen bled in to 1 atmosphere. With agitation the reactor contents were heated to 60° C., whereupon 558 parts of propylene oxide were added at a rate so that the temperature was maintained constant at about 120° C. On completion of the propylene oxide addition, heating was continued at the indicated temperature until the acid value of about 0.5 was obtained. The resultant product exhibited a hydroxyl value of 187 corresponding to a calculated average molecular weight of about 300.

To the reactor contents were added 11 parts of morpholine and with agitation held at 80° C. for about 20 minutes. Analysis of the resultant product indicated that in excess of 95% of the starting maleate residues were isomerized to fumarate residues.

EXAMPLE II

The following resin molding compositions were processed in an Accuratio VR-75 RIM machine.

|  | Composition (parts) | |
| --- | --- | --- |
|  | A | B |
| Oligomeric PE-Exam. I | 90 | 90 |
| Diethyltoluene diamine | 10 | 10 |
| t-butyl perbenzoate | 2.6 | 2.6 |
| dibutyltindilaurate | — | 0.1 |
| PEP 183S (Air Products) | 0.3 | 0.3 |
| Isonate 143 L (Upjohn) | 90 | 90 |

Both compositions A and B possessed good stability in the RIM machine and exhibited gel times of less than 3 seconds when mixed and injected. A similar composition to that of B but without the diamine component exhibited a gel time greater than 12 seconds.

Molding compositions A and B were injected into a mold containing 2 preplaced random woven glass mats (Owens Corning 8610). The panels were demolded after 2 minutes using 200° F. mold temperature. The physical properties of the resultant molded panels without postcuring are given as follows;

|  | A | B |
| --- | --- | --- |
| Flex Modulus (psi) | 767,000 | 718,000 |
| Flex Strength (psi) | 17,200 | 17,900 |
| Tensile Modulus (psi) | 817,000 | 841,000 |
| Tensile Strength (psi) | 8,500 | 8,900 |
| Elongatine, % | 1.72 | 1.76 |
| HDT (ASTM D-648) - °C. | >212 | >212 |
| NII (ASTM D-256) - ft.lbs./in. | 7.7 | 8.5 |

A molded panel prepared from a composition corresponding at 2 minutes because of the extremely poor physical properties due to its uncured condition.

What is claimed is:

1. A thermoset resinous composition adapted for use in a reaction injection molding operation prepared by polymerizing a resin-forming reactant mixture consisting essentially of a polyisocyanate, an aromatic primary or secondary polyfunctional amine and a hydroxyl group bearing vinyl ester and wherein the isocyanate index of said reactant mixture is from about 95 to 105.

2. The thermoset resinous composition according to claim 1 wherein said vinyl ester consists of the reaction product of an acrylic acid and an epoxy resin having oxirane group functionality.

3. The thermoset resinous composition according to claim 2 wherein the polyisocyanate is selected from the group consisting of methylene-4,4'-diphenylidiisocyanate, liquified methylene-4,4'-diphenyldiisocyanate, a polymeric analog of methylene-4,4'-diphenyldiisocynanate and mixtures thereof.

* * * * *